United States Patent [19]

Sasaki

[11] 4,389,704
[45] Jun. 21, 1983

[54] POWER SOURCE SUPPLY SYSTEM

[75] Inventor: Ken Sasaki, Higashiyamato, Japan

[73] Assignee: Casio Computer Co., Ltd., Tokyo, Japan

[21] Appl. No.: 195,473

[22] Filed: Oct. 9, 1980

[30] Foreign Application Priority Data

Oct. 19, 1979 [JP] Japan ................................ 54-135357

[51] Int. Cl.³ ............................................ H02M 3/06
[52] U.S. Cl. ..................................... 363/62; 368/156; 368/204
[58] Field of Search .................. 363/62; 368/203, 155, 368/204, 156

[56] References Cited

U.S. PATENT DOCUMENTS 3,863,135  1/1975  Atwood et al. ........................ 363/62
3,868,560  2/1975  Hoffman, Jr. ......................... 363/62
4,094,137  6/1978  Morokawa ....................... 368/204 X

FOREIGN PATENT DOCUMENTS 2618863  11/1977  Fed. Rep. of Germany .
1483382   8/1977  United Kingdom .
1567475   5/1980  United Kingdom .

Primary Examiner—William M. Shoop
Attorney, Agent, or Firm—Frishauf, Holtz, Goodman and Woodward

[57] ABSTRACT

A power source supply system uses an electric cell power source whose output voltage is 3 V, and drops the output voltage of 3 V to 1.5 V by a first voltage drop circuit and further drops the voltage of 1.5 V to 0.75 V to operate a logic circuit at the dropped voltage of 0.75 V.

18 Claims, 7 Drawing Figures

FIG. 3A  FIG. 3B
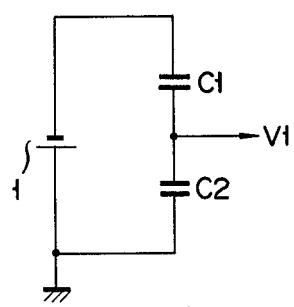
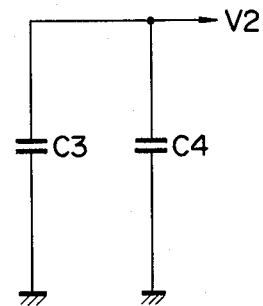
FIG. 3C
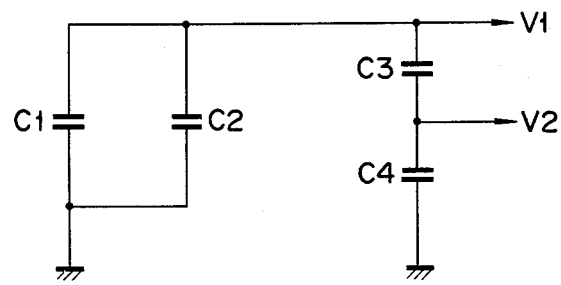

POWER SOURCE SUPPLY SYSTEM

BACKGROUND OF THE INVENTION

The present invention relates to a power source supply system for electronic equipment such as an electronic wristwatch using electric cells as the power source.

Electronic wristwatches and electronic compact calculators having electric cells as power sources have recently become available which include heavy load circuits which greatly reduce the voltage of the electric cells when operated, such as an illumination lamp for illuminating a display part, a speaker for an alarm sound, a buzzer, etc. However, with such equipment with an electric cell which drives such a heavy load circuit, the electric cell voltage is reduced by driving the heavy load circuit, frequently resulting in erroneous operation of the electronic circuit. In order to prevent erroneous operation of the electronic circuit, it is possible in advance to set the voltage level supplied to the electronic circuit to be high so that the voltage level, even after it is reduced by driving the heavy load circuit, may not become lower than the minimum voltage required for driving the electronic circuit. However, when the voltage to be supplied to the electronic circuit is set at a high level, a voltage of a level which is higher than the required level is supplied to the electronic circuit when the heavy load circuit is not in operation, so that extra power is consumed and the service life of the electric cell is unnecessarily shortened.

When two quartz oscillators or a quartz oscillator of 4 MHz band is used for attaining higher precision in the watch, the power consumption of the quartz oscillator and the divider become great, so that a power source supply system has been desired which is capable of providing a minimum voltage for driving the electronic circuit when the heavy load circuit is not in operation and providing a high voltage to the electronic circuit which prevents erroneous operation thereof when the heavy load circuit is in operation.

The present invention has been made to overcome these problems and has for its object to provide a power source supply system which enables power savings and longer service life of the electric cell.

It is another object of the present invention to provide a power source supply system which prevents erroneous operation or interruption of operation of the electronic circuit when the heavy load circuit operates.

SUMMARY OF THE INVENTION

To the above and other ends, the present invention provides a power supply system for an electronic device which comprises an electric cell power source, first voltage dropping means for outputting a first dropped voltage by dropping an output voltage from said electric cell power source to half its value, second voltage dropping means for providing a second dropped voltage by dropping said first dropped voltage obtained from said first voltage dropping means to half its value, and a logic circuit having at least an oscillation circuit to which is supplied said second dropped voltage.

In accordance with the present invention, unnecessary consumption of power may be eliminated, the service life of the electric cell may be lengthened, and erroneous operation of the circuit may be prevented even when the electric cell voltage is reduced by driving an illumination lamp, a buzzer or the like.

BRIEF DESCRIPTION OF THE DRAWINGS

FIGS. 3A, 3B and 3C are views illustrating the connecting condition of the capacitors of the voltage drop units of FIG. 1;

DETAILED DESCRIPTION

Figure 1:
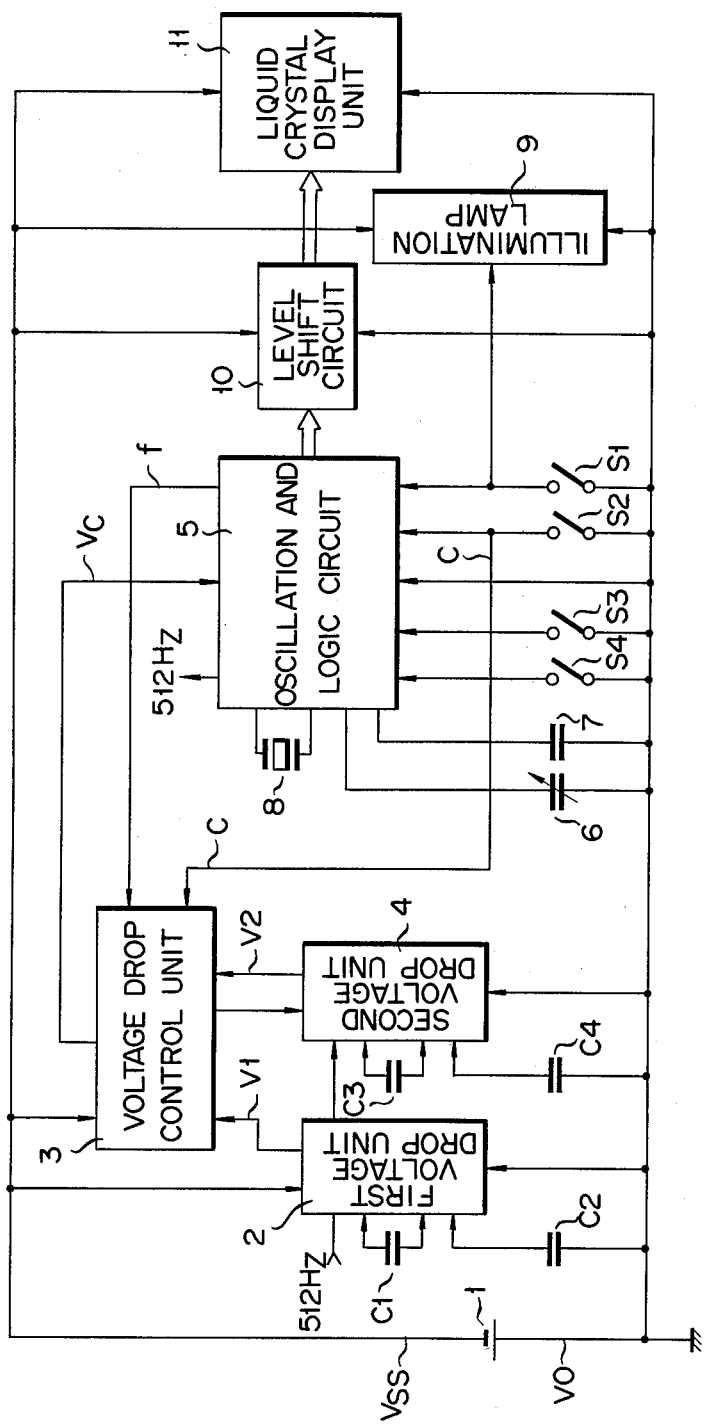
FIG. 1 is a view illustrating a power source supply system for an electronic wristwatch in accordance with one embodiment of the present invention.

FIG. 1 shows a power source supply of the present invention as applied to an electronic wristwatch. In this figure, numeral 1 denotes a lithium cell whose anode is grounded and which has a cell capacity of 3 V. The output voltage VSS ($-3$ V) of the electric cell 1 is supplied to a first voltage drop unit 2. The first voltage drop unit 2 comprises an LSI, to which are attached a voltage drop capacitor C1 and a voltage drop capacitor C2 connected to a ground voltage V0 side of the electric cell 1. The first voltage drop unit 2 drops the electric cell voltage VSS to half its value, $\frac{1}{2}$ VSS ($-1.5$ V) which is obtained as an output voltage V1. The output voltage V1 is supplied to a second voltage drop unit 4 through a voltage drop control unit 3 as will be described hereinafter. The second voltage drop unit 4 comprises an LSI, to which are attached a voltage drop capacitor C3 and a voltage drop capacitor C4 connected to the ground voltage V0 of the electric cell 1. The second voltage drop unit 4 further drops the output voltage V1 supplied through the voltage drop control unit 3 to half its value, $\frac{1}{4}$ VSS ($-0.75$ V) which is supplied to the voltage drop control unit 3 as an output voltage V2. The output voltage VSS of the electric cell 1 is supplied to the voltage drop control unit 3, and the ground voltage V0 of the electric cell 1 is supplied to the first and second voltage drop units 2 and 4, respectively.

An output voltage Vc is obtained from the voltage drop control unit 3 which is supplied as a driving voltage to an oscillation and logic circuit 5. The oscillation and logic circuit 5 is a watch circuit which comprises an oscillation circuit, a divider, a time counting circuit and so on (not shown), and which is driven by the output voltage Vc from the voltage drop control unit 3 and the ground voltage V0 for providing time display signals such as "hour", "minute" and "second". To the oscillation circuit are attached a variable capacitor 6, a temperature compensating capacitor 7 and a quartz oscillator 8 whose oscillating frequency is in the 4 MHz band, e.g., 4,194,304 Hz. The operation signals of an illumination lamp switch S1, a clear switch S2, a correction switch S3, and a correction digit selection switch S4 are supplied to the oscillation and logic circuit 5. The operation signal of the lamp switch S1 is supplied to an illumination lamp 9 for lighting it and the output voltage VSS of the electric cell 1 and the ground voltage V0 are also supplied thereto as driving voltages. The oscillation and logic circuit 5 which has received the operation signal from the lamp switch S1 supplies an output signal f to the voltage drop control unit 3 which sets a voltage of high level from the time the lamp starts lighting until a predetermined period of time has elapsed after the lamp goes off.

When an operation signal c of the clear switch S2 is supplied to the oscillation and logic circuit 5, the contents of the divider and the time counting circuit are cleared. The operation signal c of the clear switch S2 is also supplied to the voltage drop control unit 3. The voltage drop control unit 3 controls the level of the output voltage Vc to be supplied to the oscillation and logic circuit 5 in response to the output signal f or the operation signal c of the clear switch 52. The oscillation and logic circuit 5 receives the operation signals of the correction switch S3 and the correction digit selection switch S4. After the digit to be corrected is selected by the correction digit selection switch S4, the oscillation and logic circuit 5 advances the counted value of the digit specified by the correction switch S3 for correcting the time information. A signal of 512 Hz obtained by the divider of the oscillation and logic circuit 5 is supplied to the first voltage drop unit 2 and through it to the second voltage drop unit 4.

The time information outputted from the oscillation and logic circuit 5 is fed to a level shift circuit 10. The output voltage VSS of the electric cell 1 and the ground voltage V0 are supplied as driving voltages to the level shift circuit 10 which level-shifts the time information to a predetermined value supplied from the oscillation and logic circuit 5 based on the voltages VSS and V0 and which provides it to a liquid crystal display unit 11. The output voltage VSS of the electric cell 1 and the ground voltage V0 are, respectively, supplied to the liquid crystal display unit 11. The liquid crystal display unit 11, based on the voltages VSS and V0, displays the time information supplied from the oscillation and logic circuit 5 through the level shift circuit 10.

Figure 2:
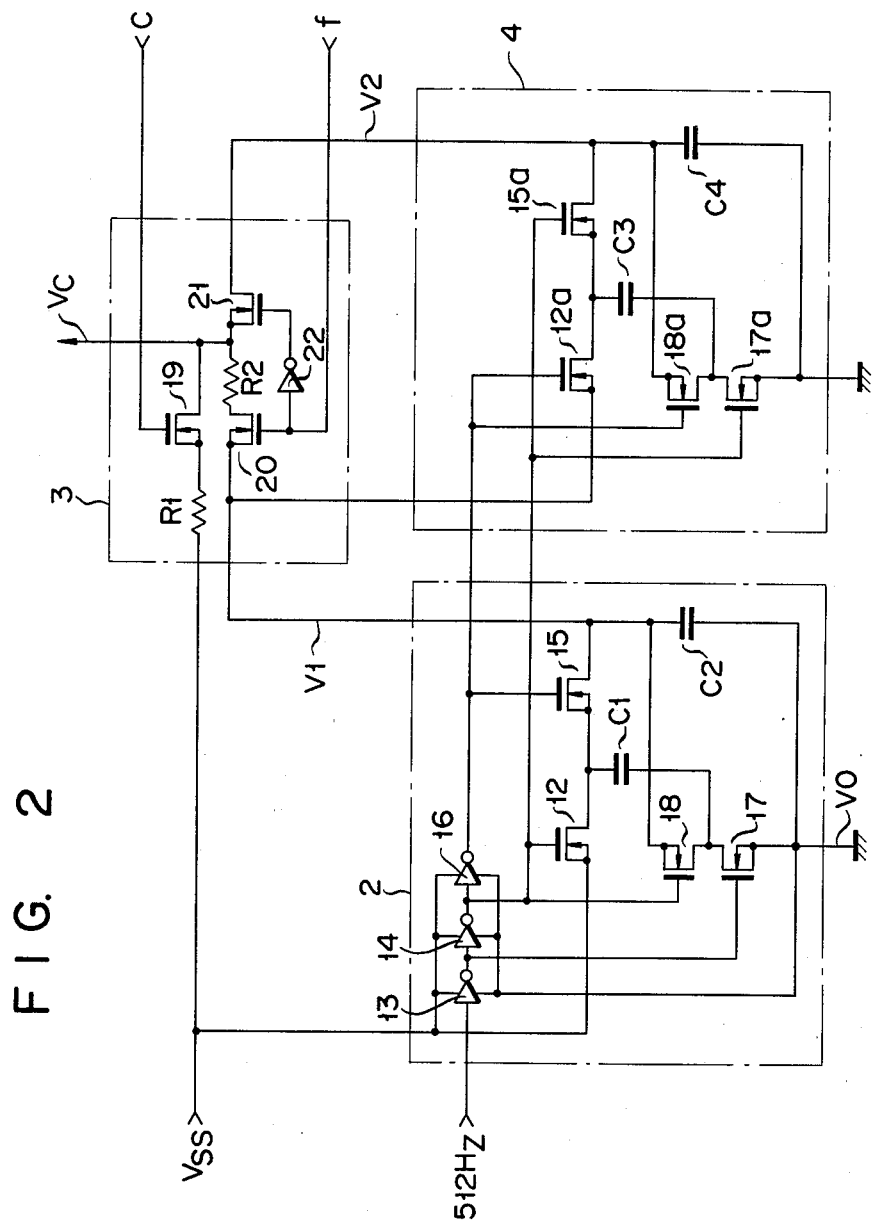
FIG. 2 is a circuit diagram showing the details of the first voltage drop unit and the second voltage drop unit of the voltage drop control until shown in FIG. 1.

FIG. 2 shows in detail the circuit construction of the voltage drop control unit 3 and the first and second voltage drop units 2 and 4. At the first voltage drop unit 2, the output voltage VSS of the electric cell 1 is supplied to the source of an n-type channel MOS transistor 12 (referred to hereinafter as a transistor for brevity). A signal of a predetermined frequency, e.g., 512 Hz, from the oscillation and logic circuit 5 is supplied to the gate of the transistor 12 through inverters 13 and 14 in a sequential manner. A transistor 15 is connected in series with the transistor 12. The output signal of the inverter 14 is supplied to the gate of the transistor 15 through an inverter 16. The ground voltage V0 as a voltage of high level and the output voltage VSS of the electric cell 1 as a voltage of low level are supplied to the respective inverters 13, 14 and 16. The output signals of the respective inverters 13, 14 and 16 are connected to the voltage V0 side of high level when their input signals are of high level and are connected to the voltage VSS side of low level when their input signals are of low level. The output signal of the inverter 13 is supplied to the gate of a transistor 17 to which is fed the ground voltage V0. A transistor 18 is connected in series with the transistor 17. The output signal of the inverter 14 is supplied to the gate of the transistor 18. The connection point of the transistors 12 and 15 and that of the transistors 17 and 18 are connected to each other through the capacitor C1. The drain side of the transistor 15 is connected to the ground voltage V0 through the capacitor C2. The connection point between the drain of the transistor 15 and the capacitor C2 is connected to the source side of the transistor 18. The output voltage V1 is obtained between the transistor 15 and the capacitor C2 and is supplied to the voltage drop control unit 3.

The second voltage drop unit 4 is of the same construction as the first voltage drop unit 2. The same parts are thus designated by the same reference numerals with "a" added thereto. The part corresponding to numeral 18 will be designated by the numeral 18a, for example, and the detailed description thereof will be omitted. The output voltage V1 of the first voltage drop unit 2 is supplied to a transistor 12a at the second voltage drop unit 4. An inverted signal of the 512 Hz signal outputted from the inverter 16 of the first voltage drop unit 2 is supplied to the gates of the transistors 12a and 18a, respectively. The output signal of the inverter 14 is supplied to transistors 15a and 17a. Symbol C3 denotes a capacitor which corresponds to the capacitor C1 of the first voltage drop unit 2, and C4 corresponds to the capacitor C2.

At the voltage drop control unit 3, the output voltage VSS of the electric cell 1 is supplied to a transistor 19 through a resistor R1. The operation signal c of the clear switch S2 is supplied to the gate of the transistor 19. The output voltage V1 of the first voltage drop unit 2 is fed to a transistor 20 which is connected in series with a transistor 21 through a resistor R2. The output signal f of the oscillation and logic circuit 5 is fed to the gate of the transistor 20 and is also supplied to the gate of a transistor 21 through an inverter 22. The output voltage V2 of the second voltage drop unit 4 is fed to the transistor 21. The output voltage Vc is obtained at the connection point of the transistor 21 and the resistor R2.

The capacitors C1 through C4 are all of the same capacity.

The mode of operation of the above embodiment will be described. When the clear switch S2 is operated after mounting the electric cell 1, the operation signal c of high level is supplied to the voltage drop control unit 3 and the oscillation and logic circuit 5. At the voltage drop control unit 3, the transistor 19 is enabled by the operation signal c. Consequently, the output voltage VSS of the electric cell 1 is obtained from the voltage drop control unit 3 as the voltage Vc through the resistor R1 and the transistor 19 and is transmitted to the oscillation and logic circuit 5. The output voltage Vc becomes slightly lower than the output voltage VSS of the cell due to the resistor R1 and the enabled resistance of the transistor 19. When the output voltage Vc is fed to the oscillation and logic circuit 5 from the voltage drop control unit 3, the oscillation and logic circuit 5 starts operating and a signal of a frequency of 512 Hz is outputted from the divider to be supplied to the first voltage drop unit 2 for initiating the voltage drop operation. When the signal of 512 Hz is of high level, the output signal of the inverter 13 is of low level and the transistor 17 is thus disabled. Since the output signal of the inverter 14 becomes a signal of high level, the transistors 12 and 18 are enabled. Since the output signal of the inverter 16 becomes a signal of low level, the transistor 15 is disabled. Thus, the wiring condition of the capacitor C1 with C2 becomes such that the output voltage VSS of the electric cell 1 is applied to the capacitors C1 and C2 which are connected in series with each other, as shown in FIG. 3A. The output voltage V1 from the first voltage drop unit 2 becomes half of the output voltage VSS of the electric cell 1, that is, ½ VSS as it is obtained from the connection point of the capacitors C1 and C2. Since the output signal of the inverter 14 is a signal of high level at the second voltage drop unit 4, the transistors 15a and 17a are enabled. Since the output signal of the inverter 16 is of low level, the transistors 12a and 18a are disabled. Thus, the wiring condition of the capacitors C3 with C4 becomes as shown in FIG. 3B, that is, the capacitors C3 and C4 connected in parallel with each other are connected to the ground voltage V0. The voltage V2 obtained from the second voltage drop unit 4 becomes the discharging voltage of the capacitors C3 and C4 which are connected in parallel with each other. The voltage V2 will be described in more detail hereinafter.

When the signal of 512 Hz is of low level, the transistors 15 and 17 are enabled and the transistors 12 and 18 are disabled in the first voltage drop unit 2. The transistors 12a and 18a are enabled and the transistors 15a and 17a are disabled in the second voltage drop unit 4. Consequently, the wiring condition of the capacitors C1 through C4 becomes as shown in FIG. 3C, that is, the capacitors C1 and C2 are connected in parallel with each other and the capacitors C3 and C4 are connected in series with each other. When the signal of 512 Hz is of high level, a voltage of $\frac{1}{2}$ VSS is charged in the capacitors C1 and C2 as has been described above. The voltage of $\frac{1}{2}$ VSS is obtained as the voltage V1 from the first voltage drop unit 2. Since the voltage of $\frac{1}{2}$ VSS is applied to both ends of the capacitors C3 and C4, the voltage of $\frac{1}{4}$ VSS is produced as the voltage V2, which is half the voltage at the first voltage drop unit 2, that is, half of $\frac{1}{2}$ VSS. When the signal of 512 Hz is of high level in FIG. 3B, the discharging voltage of the capacitors C3 and C4 is $\frac{1}{4}$ VSS. Charged when the signal of 512 Hz is of low level, so that the $\frac{1}{4}$ VSS voltage is obtained as the voltage V2 from the second voltage drop unit 4.

At the first voltage drop unit 2, the voltage that is half of the output voltage VSS of the electric cell 1 is fed to the voltage drop control unit 3 as the voltage V1; and at the second voltage drop unit 4, the voltage that is half of the output voltage V1 of the first voltage drop unit 2, i.e., $\frac{1}{4}$ VSS, is fed to the voltage drop control unit 3 as the voltage V2.

When the output signal f from the oscillation and logic circuit 5 is of low level, that is, when the illumination lamp 9 is under disabled condition, the transistor 20 is disabled and the transistor 21 is enabled in the voltage drop control unit 3. The output voltage V2 of the second voltage drop unit 4 is obtained as the voltage Vc through the transistor 21 to be supplied to the oscillation and logic circuit 5. The oscillation and logic circuit 5 is driven by the output voltage V2 of the second voltage drop unit 4, i.e., $\frac{1}{4}$ VSS ($-0.75$ V).

Figure 4:
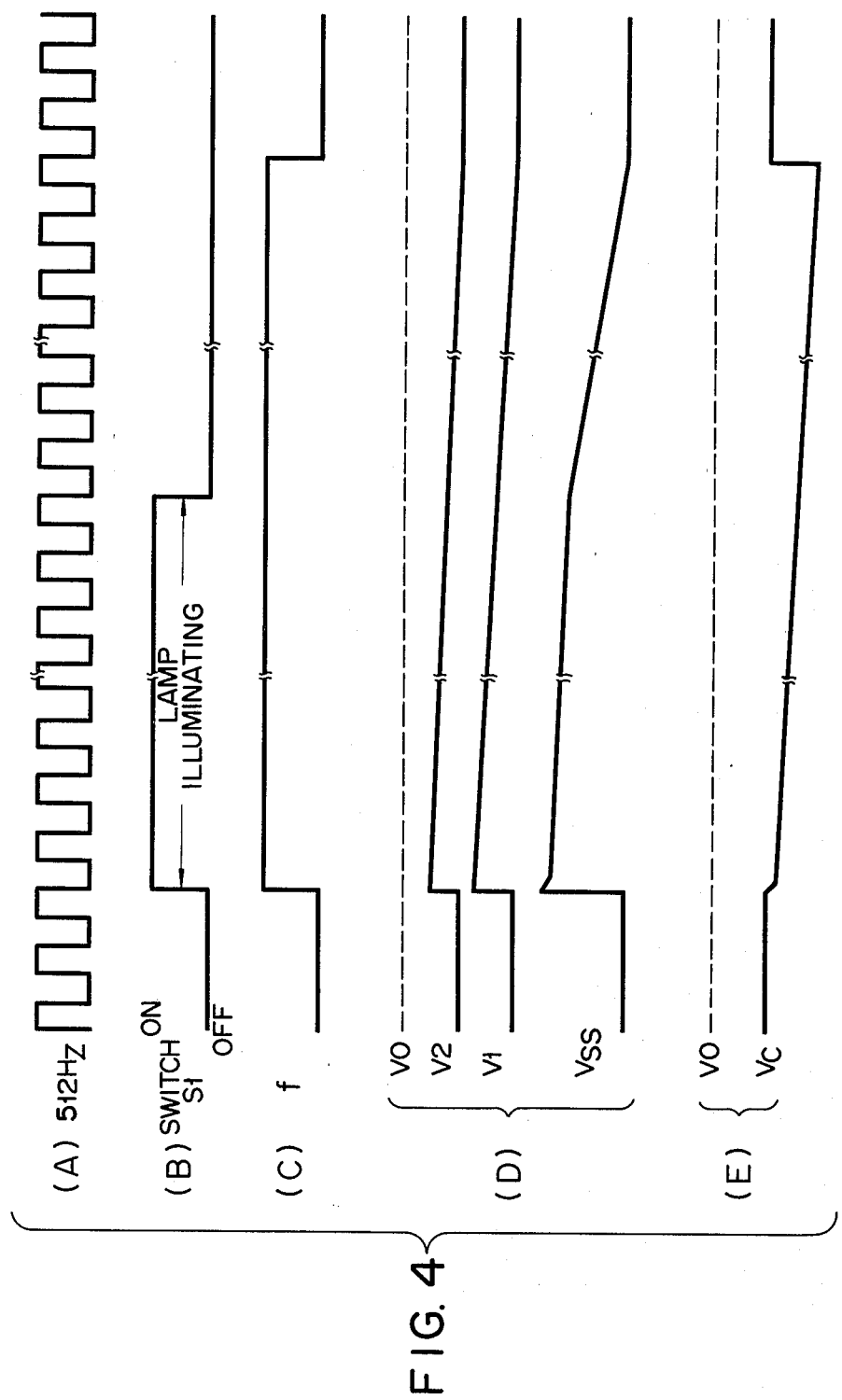
FIG. 4 is a time chart when the illumination lamp is operated.

FIG. 4 shows a time chart when the lamp switch S1 is turned on for illuminating the liquid crystal display unit 11. When the lamp switch S1 is turned on, a large current flows through the illumination lamp 9 due to its heavy load, and the output voltage VSS of the electric cell 1 becomes greatly reduced as shown in FIG. 4D. With the reduction in the output voltage VSS of the electric cell 1, the output voltage V1 of the first voltage drop unit 2 and the output voltage V2 of the second voltage drop unit 4 are both reduced as shown in FIG. 4D.

Since the operation signal obtained when the lamp switch S1 is turned on is supplied to the oscillation and logic circuit 5, the output signal f of high level is obtained from the oscillation and logic circuit 5, as shown in FIG. 4C, to be transmitted to the voltage drop control unit 3. At the voltage drop control unit 3, the transistor 20 is enabled and the transistor 21 is disabled. Then, instead of the output voltage V2 of the second voltage drop unit 4, the output voltage V1 of the first voltage drop unit 2 is obtained through the transistor 20 and the resistor R2 as the output voltage Vc of the voltage drop control unit 4.

The oscillation and logic circuit 5 is driven with the output voltage V2 of the second voltage drop unit 4, i.e., $\frac{1}{4}$ VSS, when the lamp is not illuminated; it is driven with the output voltage V1 of the first drop unit 2, i.e., $\frac{1}{2}$ VSS, when the lamp is illuminated, as shown in FIG. 4E.

When the lamp switch S1 is turned off, the output voltage VSS of the electric cell 1, the output voltage V1 of the first voltage drop unit 2 and the output voltage V2 of the second voltage drop unit 4, which are reduced when the illumination lamp 9 is illuminated, gradually return to normal voltages. The signal f for controlling the voltage drop control unit 3 becomes a signal of low level when a predetermined period of time has elapsed which is required for returning the voltages VSS, V1 and V2 to their normal values, as shown in FIG. 4C. Thus, the transistor 20 is disabled and the transistor 21 is enabled in the voltage drop control unit 3. The voltage Vc obtained from the voltage drop control unit 3 becomes the output voltage V2 of the second voltage drop unit 4, and the oscillation and logic circuit 5 is driven again by the voltage V2 ($\frac{1}{4}$ VSS).

The oscillation and logic circuit 5 is thus constantly provided with a voltage of over $\frac{1}{4}$ VSS so that the oscillation of the oscillation circuit 5 is not interrupted.

Although the voltage $\frac{1}{2}$ VSS is supplied to the oscillation and logic circuit 5 when the illumination lamp 9 is lit in the above embodiment, the output voltage VSS of the electric cell 1 may be supplied in place of $\frac{1}{2}$ VSS.

Although the liquid crystal display unit 11 is driven with the voltage VSS in the above embodiment, $\frac{1}{2}$ VSS, $\frac{1}{4}$ VSS or the like may be supplied instead of the voltage VSS, and the display unit 11 may be dynamically driven at $\frac{1}{3}$ bias.

Furthermore, voltage switching is used for lighting up the illumination lamp in the above embodiment. However, an alarm circuit for generating an alarm signal at an alarm time may alternatively be included for performing the voltage switching when the time is to be announced by this alarm signal.

Figure 5:
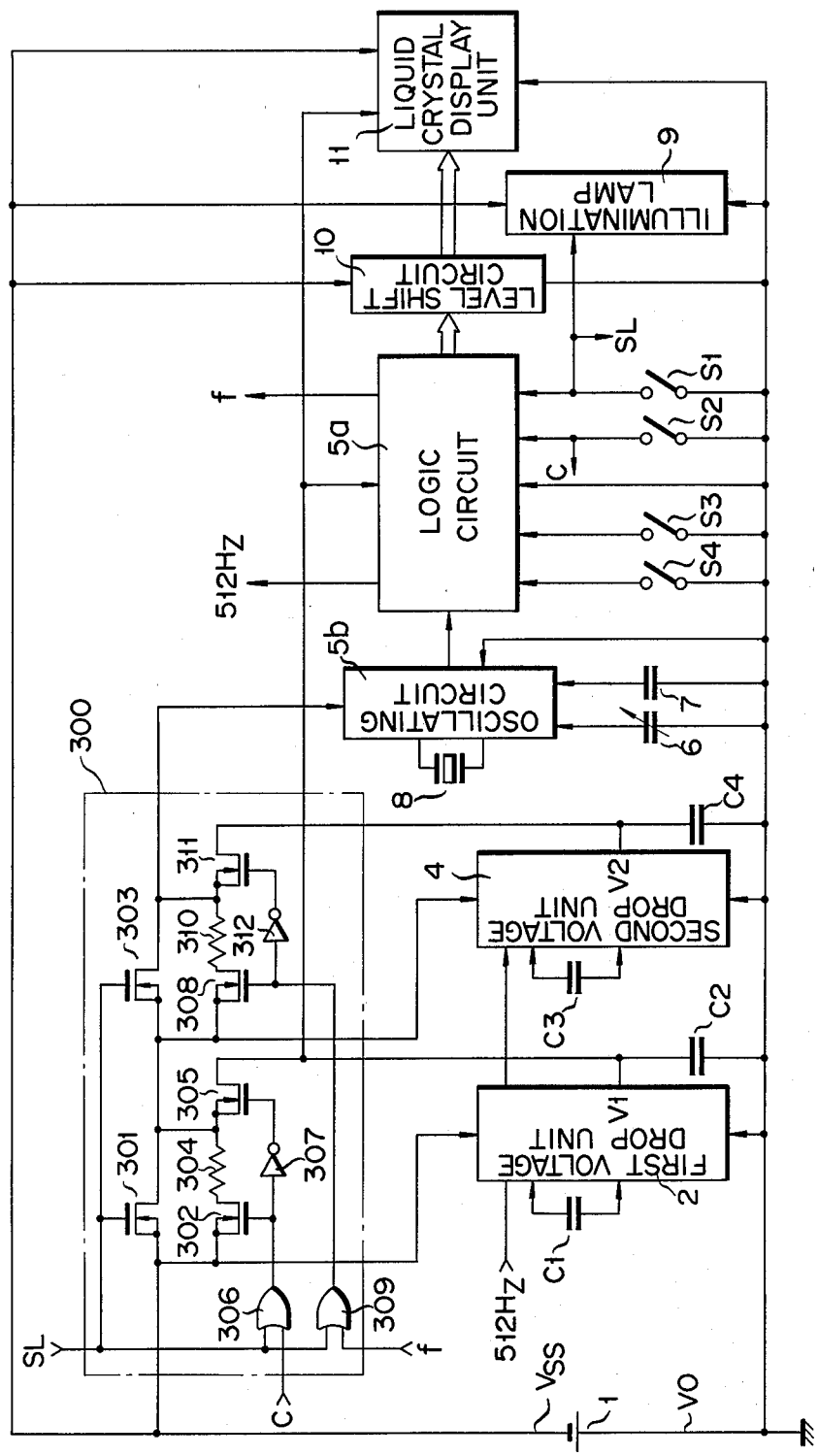
FIG. 5 is a circuit diagram of another embodiment of the present invention.

Another embodiment of the present invention will now be described with reference to FIG. 5. The same parts are designated with the same reference numerals as in FIG. 1, and the description thereof is omitted. In the figure, numeral 300 denotes a voltage drop control unit. At this voltage drop control unit 300, the output voltage VSS of the electric cell 1 is supplied to transistors 301 and 302, and to the first voltage drop unit 2. A transistor 303 is connected in series with the transistor 301. An operation signal SL of the lamp switch S1 is fed to the gates of the transistors 301 and 302, respectively. A transistor 305 is connected in series with the transistor 302 through a resistor 304. The output signal of an OR circuit 306 is supplied to the gate of the transistor 302 and to the gate of the transistor 305 through an inverter 307. The operation signal SL of the lamp switch S1 is fed to one of the input terminals of the OR circuit 306, and the operation signal c of the clear switch S2 is fed to the other input terminal. The connection point of the transistors 301 and 303 is connected to the connection point of a resistor 304 and the transistor 305. The output voltage V1 of the first voltage drop unit 2 is supplied to the drain side of the transistor 305. The output voltage V1 is also supplied to a logic circuit 5a and the liquid crystal display unit 11 through the voltage drop control unit 300. The liquid crystal display unit 11 is dynamically driven at $\frac{1}{3}$ bias with the output voltage VSS of the electric cell 1, the ground voltage V0 and the output voltage V1 of the first voltage drop unit 2. The source voltage of the transistor 303 is supplied to a transistor 308 as well as to the second voltage drop unit 4 as a driving voltage. The output signal of an OR circuit 309 is fed to the gate of the transistor 308. The operation signal C of the clear switch S2 is supplied to one of the input terminals of the OR circuit 309, and the output signal f of the logic circuit 5a is supplied to the other input terminal. A transistor 311 is connected in series with the transistor 308 through a resistor 310. The output signal of the OR circuit 309 is supplied to the gate of the transistor 311 through an inverter 312. The connection point of the resistor 310 and the transistor 311 is connected to the drain side of the transistor 303, and the output voltage V2 of the second voltage drop unit 4 is also supplied to the drain side of the transistor 311. The drain voltage of the transistor 303 is obtained from the voltage drop control unit 300 to be supplied to the oscillation circuit 5b as a driving voltage.

The mode of operation of the above embodiment will now be described. When the clear switch S2 is operated after mounting the electric cell 1, the operation signal C of high level is supplied to the voltage drop control unit 300 as well as to the logic circuit 5a. The operation signal C is supplied to the OR circuits 306 and 309 in the voltage drop control unit 300. The transistor 302 is enabled by the output signal of the OR circuit 306, and the transistor 304 is disabled since the output signal of the OR circuit 306 is inverted by the inverter 307. Similarly, the transistor 308 is enabled by the output signal of the OR circuit 309, and the transistor 311 is disabled since the output signal of the OR circuit 309 is inverted by the inverter 312. The transistors 301 and 303 are disabled when the illumination lamp 9 is not illuminated. The output voltage VSS of the electric cell 1 is thus obtained from the voltage drop control unit 300 through the transistor 302, the resistor 304, the transistor 308, and the resistor 310 to be supplied to an oscillation circuit 5b. The output voltage VSS of the electric cell 1 is slightly lower than −3 V since it is obtained through the resistors 304 and 310 in the voltage drop control unit 300. A signal of 512 Hz is obtained from the logic circuit 5a by the oscillation circuit 5b driven by the output voltage VSS of the electric cell 1. The signal of 512 Hz is supplied to the first voltage drop unit 2, and a signal obtained by the inversion of this signal is supplied to the second voltage drop unit 4. The first and second voltage drop units 2 and 4 then start their voltage dropping operations. A voltage of $\frac{1}{2}$ VSS is outputted from the first voltage drop unit 2, and a voltage of $\frac{1}{3}$ VSS is outputted from the second voltage drop unit 4 to be supplied to the voltage drop control unit 300.

The output signal f of the logic circuit 5a is of low level when the illumination lamp 9 is not lit. Thus, at the voltage control unit 300, the output signals of the OR circuits 306 and 309 become those of low level; the transistors 302, 308, 301 and 303 are disabled; and the transistors 305 and 311 are enabled. The output voltage of the second voltage drop unit 4 is then obtained from the voltage drop control unit 300 through the transistor 311 to be supplied to the oscillation circuit 5b. Consequently, the oscillation circuit 5b is driven at $\frac{1}{3}$ VSS when the illumination lamp 9 is not lit.

When the lamp switch S1 is turned on to light the illumination lamp 9, the operation signal SL of the lamp switch S1 of high level and the output signal f of the logic circuit 5a are supplied to the voltage drop control unit 300. Then, in the voltage drop control unit 300, the transistors 301 and 303 are enabled, the output signal of the OR circuit 306 becomes high level, and the transistor 302 is enabled. The transistor 305 is disabled and the output signal of the OR circuit 309 becomes high level. The transistor 308 is thus enabled and the transistor 311 is disabled. The output voltage VSS of the electric cell 1 is obtained from the voltage drop control unit 300 through the transistors 301 and 303 to be supplied to the oscillation circuit 5a. The oscillation circuit 5a is driven by the output voltage VSS of the electric cell 1 when the illumination lamp 9 is lit.

The output signal f of the logic circuit 5a is of high level from the start of the lighting operation of the illumination lamp until a predetermined period of time has elapsed after the lamp goes off. Thus, during the predetermined period of time after the illumination lamp 9 starts operating, when the output signal f of high level is supplied to the voltage drop control unit 300 from the logic circuit 5a, the transistors 301 and 303 are disabled, the transistor 302 is disabled and the transistor 305 is enabled since the output signal of the OR circuit 306 is of low level, and the transistor 308 is enabled and the transistor 311 is disabled since the output signal of the OR circuit 309 is of high level. The output voltage V1 from the first voltage unit 2 is obtained at the voltage drop control unit 300 through the transistor 304 and 308 and the resistor 310 to be supplied to the oscillation circuit 5b. The oscillation circuit 5b can be driven at the voltage of $\frac{1}{2}$ VSS. When the illumination lamp 9 is switched from the lit state to the unlit state, the output voltage VSS of the electric cell 1 which has dropped in driving the illumination lamp 9 gradually restores itself so that the oscillation circuit 5b can be driven with the voltage of $\frac{1}{2}$ VSS without any problem.

When the output signal f of the logic circuit 5a becomes low level, the output voltage V2 of the second voltage drop unit 4 is again obtained from the voltage drop control unit 300, and the oscillation circuit 5b is driven with the voltage of $\frac{1}{3}$ VSS.

The oscillation circuit 5b is driven with the voltage of $\frac{1}{3}$ VSS when the illumination lamp 9 is not lit but is driven with the output voltage VSS of the electric cell 1 when the illumination lamp 9 is lit. The oscillation circuit 5b is driven with the voltage of $\frac{1}{2}$ VSS during a predetermined period of time after the lamp goes off.

Although a signal of 512 Hz was used as a voltage drop clock in the above embodiments, the present invention is not limited to this. Although the voltage drop operation was initiated with the operation of the clear switch, the present invention is not limited to this, and this may alternatively be accomplished with the illumination switch or the like. Although the present invention has been described as applied to an electronic wristwatch having a liquid crystal display unit, the present invention can also be applied to a watch for displaying time with time pointers rotated by a step motor, or may be applied to a wide range of electronic devices such as compact electronic calculators, radios, TV sets, cameras, tranceivers and so on.

What is claimed is:

1. A power supply system for an electronic device comprising:
   an electric cell power source;
   first voltage dropping means coupled to said electric cell power source for outputting a first dropped voltage by dropping an output voltage from said electric cell power source to half its value;
   second voltage dropping means coupled to said first voltage dropping means for providing a second dropped voltage by dropping said first dropped voltage obtained from said first voltage dropping means to half its value; and
   a logic circuit including an oscillation circuit to which said second dropped voltage is applied, and a watch circuit for providing a time display signal by frequency dividing an oscillation signal from said oscillation circuit.

2. A power source supply system for an electronic device as claimed in claim 1 wherein:
   said logic circuit includes means for supplying a signal of a predetermined frequency, and an inverted signal of said same predetermined frequency but whose phase lags that of said signal of predetermined frequency by 180°;
   said first voltage dropping means includes means for performing a voltage dropping operation in response to said signal of a predetermined frequency supplied from said logic circuit; and said second voltage dropping means includes means for performing a voltage dropping operation in response to said inverted signal of said same/predetermined frequency.

3. A power source supply system for an electronic device as claimed in claim 2 wherein said first and second voltage dropping means each comprise two capacitors of the same capacity, and means for repeatedly changing the connected condition of said respective two capacitors to a series connection or a parallel connection in response to said signal of predetermined frequency or said inverted signal.

4. A power source supply system for an electronic device as claimed in claim 1 wherein said first dropped voltage is supplied to all of the circuits included in said logic circuit other than said oscillation circuit.

5. A power source supply system for an electronic device as claimed in claim 1 wherein said oscillation circuit of said logic circuit includes a quartz oscillator of the 4 MHz band.

6. A power source supply system for an electronic device as claimed in claim 1 wherein all of the circuits of said logic circuit are driven at said second dropped voltage.

7. A power source supply system for an electronic device comprising:
   an electric cell power source;
   voltage dropping means coupled to said electric cell power source for providing two dropped voltages of different potentials which are lower than the output voltage of said electric cell power source;
   a quartz oscillation circuit of the 4 MHz band which is coupled to said voltage dropping means to receive the lower of said two dropped voltages obtained by said voltage dropping means;
   time circuit means coupled to said oscillator circuit for providing time information by frequency dividing an oscillation signal from said quartz oscillation circuit; and
   a liquid crystal display device for being driven at said output voltage of said electric cell power source and/or said dropped voltages to display said time information obtained by said time circuit means.

8. A power source supply system for an electronic device as claimed in claim 7, wherein said time circuit means is coupled to said voltage dropping means for receiving the higher of said two dropped voltages obtained by said voltage dropping means and being operable in response to said higher of said two dropped voltages.

9. A power source supply system for an electronic device as claimed in claim 7, wherein said two dropped voltages are, respectively, one half and one quarter of said electric cell power source output voltage.

10. A power source supply system for an electronic device comprising:
    an electric cell power source;
    first voltage dropping means coupled to said electric cell power source for outputting a first dropped voltage by dropping the output voltage of said electric cell power source to half of its value;
    second voltage dropping means coupled to said first voltage dropping means for providing a second dropped voltage by dropping said first dropped voltage obtained by said first voltage dropping means to half its value;
    a logic circuit having at least an oscillation circuit to which is supplied said second dropped voltage obtained by said second voltage dropping means;
    a heavy load circuit for being driven at said output voltage of said electric cell power source which reduces said output voltage of said electric cell power source when said heavy load circuit is driven; and
    voltage switching means responsive to when said heavy load circuit is driven for switching from said second dropped voltage supplied to said oscillation circuit when said heavy load circuit is driven to a voltage higher than said second dropped voltage.

11. A power source supply system for an electronic device as claimed in claim 10, wherein:
    said logic circuit includes a time circuit means for providing a time display signal by frequency dividing an oscillation signal from said oscillation circuit;
    a time display means is provided for displaying time corresponding to said time display signal; and
    said heavy load circuit comprises an illumination lamp for illuminating said time display means.

12. A power source supply system for an electronic device as claimed in claim 10, wherein:
    said logic circuit comprises a time circuit for providing a time display signal by frequency dividing an oscillation signal from said oscillation circuit, and alarm signal generating means for generating an alarm signal when said time display signal obtained from said time circuit indicates a predetermined time; and
    said heavy load circuit comprises means for generating a buzzing sound in response to said alarm signal.

13. A power source supply system for an electronic device comprising:
    an electric cell power source;
    voltage dropping means coupled to said electric cell power source for providing two dropped voltages of different potentials which are lower than the output voltage of said electric cell power source;

a logic circuit having at least a quartz oscillation circuit which is coupled to receive the lower of said two dropped voltages obtained by said voltage dropping means;

a heavy load circuit which is driven at said output voltage of said electric cell power source and which reduces said output voltage of said electric cell when said heavy load circuit is driven; and voltage switching means responsive to driving of said heavy load circuit for switching from the lower dropped voltage supplied to said oscillation circuit when said heavy load circuit is driven to the higher voltage obtained by said voltage dropping means.

14. A power source supply system for an electronic device as claimed in claim 13 wherein:

said logic circuit includes a time circuit for providing a time display signal by frequency dividing an oscillation signal from said oscillation circuit;

a time display means is provided for displaying time corresponding to said display signal; and said heavy load circuit comprises an illumination lamp for illuminating said time display means.

15. A power source supply system for an electronic device as claimed in claim 13 wherein:

said logic circuit comprises a time circuit for providing a time display signal by frequency dividing an oscillation signal from said oscillation circuit, and alarm signal generating means for generating an alarm signal when said time display signal obtained from said time circuit indicates a predetermined time; and said heavy load circuit comprises means for generating a buzzing sound in response to said alarm signal.

16. A power supply system for an electronic device comprising:

an electric cell power source;

first voltage dropping means coupled to said electric power source for outputting a first dropped voltage by dropping an output voltage from said electric cell power source to half its value;

second voltage dropping means coupled to said first voltage dropping means for providing a second dropped voltage by dropping said first dropped voltage obtained from said first voltage dropping means to half its value; and a logic circuit having an oscillation circuit which includes a quartz oscillator of the 4 MHz band to which said second dropped voltage is applied.

17. A power source supply system for an electronic device as claimed in claim 2 wherein said first dropped voltage is supplied to all of the circuits included in said logic circuit other than said oscillation circuit.

18. A power source supply system for an electronic device as claimed in claim 2 wherein all of the circuits of said logic circuit are driven at said second dropped voltage.

* * * * *

UNITED STATES PATENT AND TRADEMARK OFFICE
CERTIFICATE OF CORRECTION

PATENT NO. : 4,389,704

DATED : June 21, 1983

INVENTOR(S) : Ken SASAKI

It is certified that error appears in the above-identified patent and that said Letters Patent is hereby corrected as shown below:

COLUMN 9 (claim 2), line 19, change "claim 1" to --claims 1 or 16--;

COLUMN 9 (claim 4), line 42, change "claim 1" to --claims 1 or 16--;

COLUMN 9 (claim 6), line 50, change "claim 1" to --claims 1 or 16--.

Signed and Sealed this

Thirteenth Day of December 1983

[SEAL]

Attest:

Attesting Officer

GERALD J. MOSSINGHOFF

Commissioner of Patents and Trademarks